June 19, 1956 G. F. SELVAGGIO ET AL 2,750,852
SHAPER
Filed July 28, 1953 3 Sheets-Sheet 1
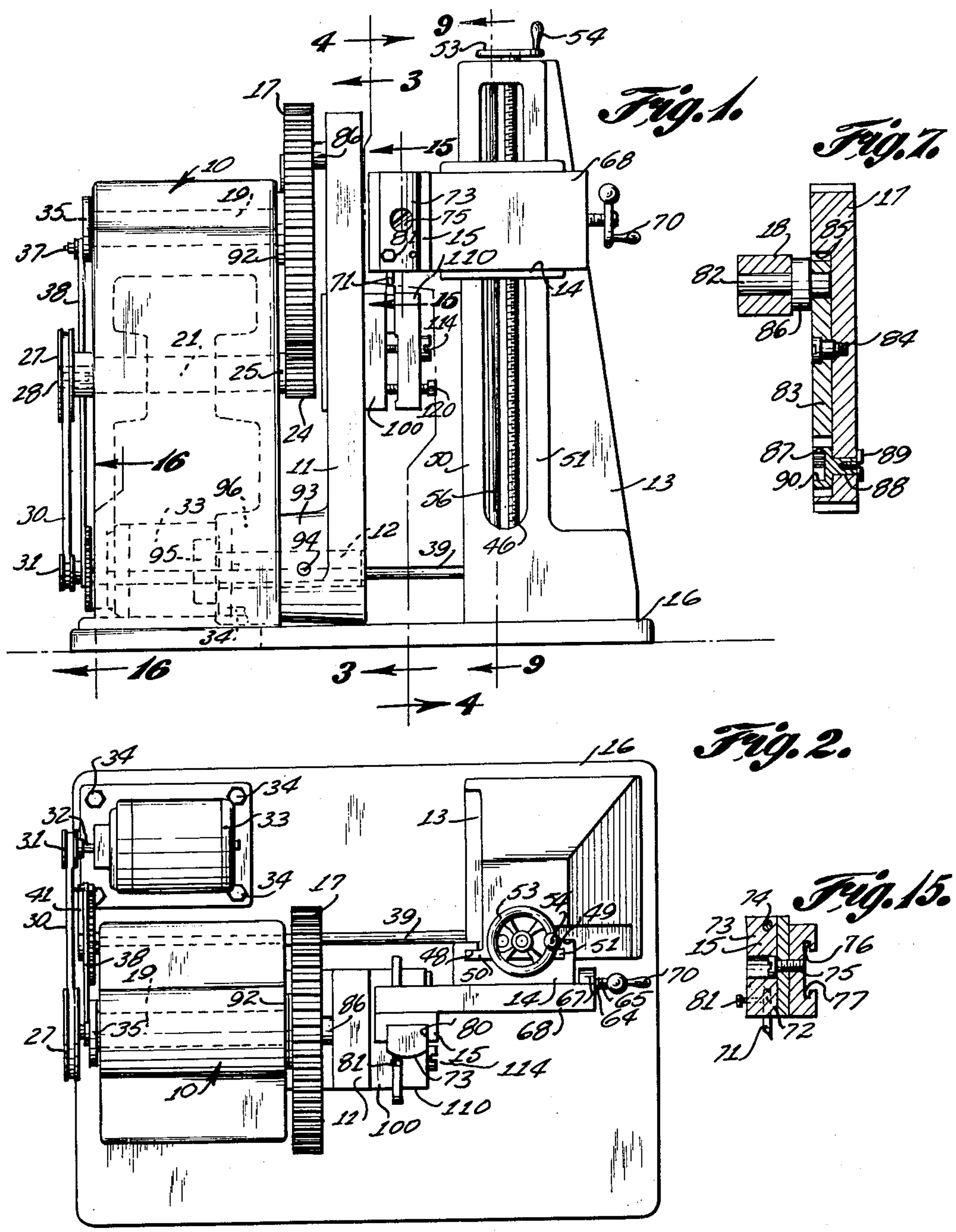
INVENTORS
Guillaume F. Selvaggio,
& Pierre C. Ringenbach.
BY Victor J. Evans & Co.
ATTORNEYS SHAPER
Filed July 28, 1953 3 Sheets-Sheet 2
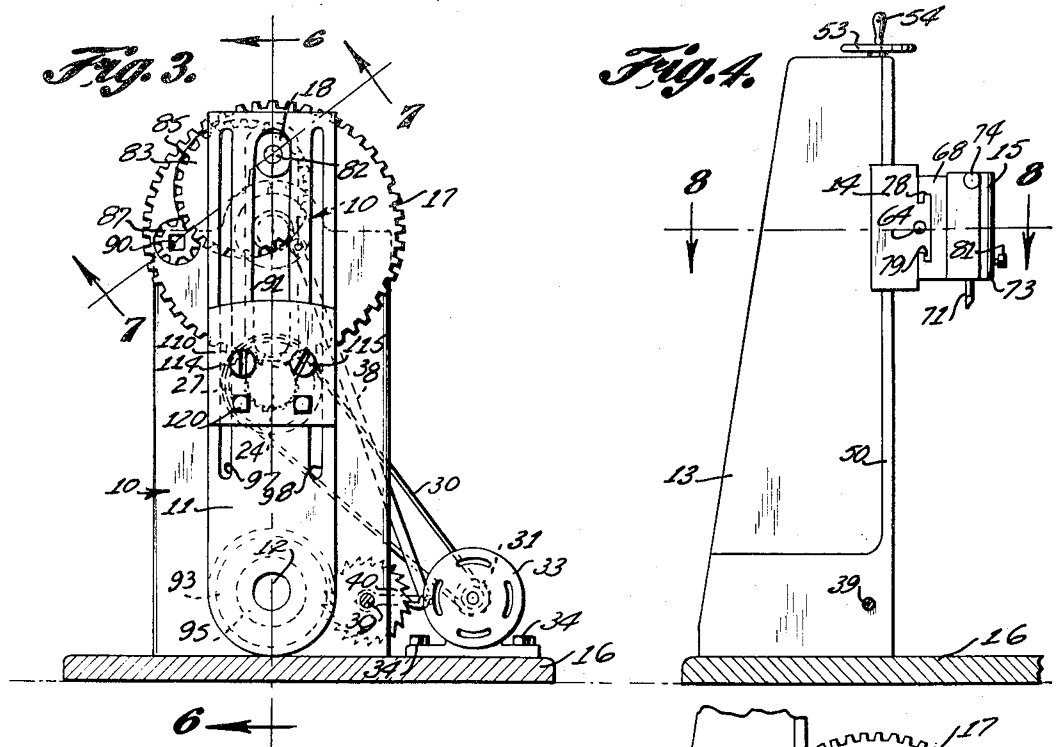
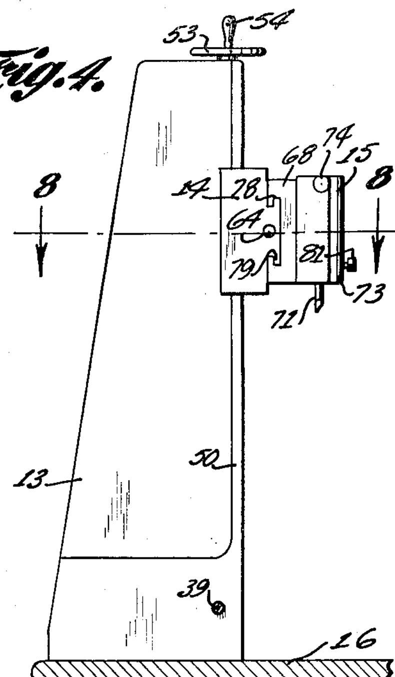
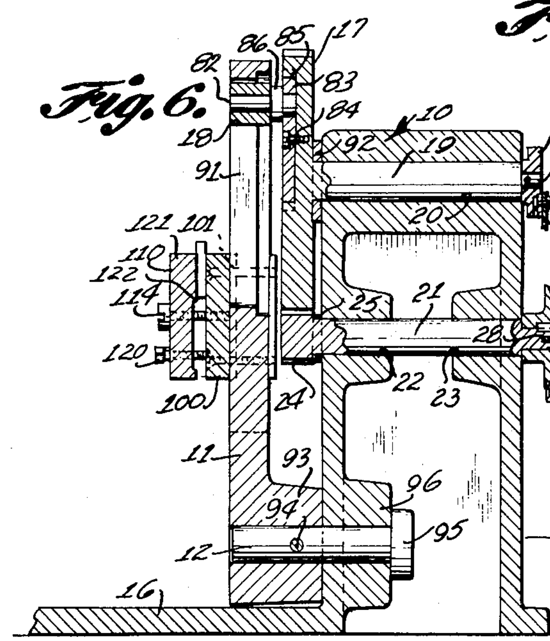
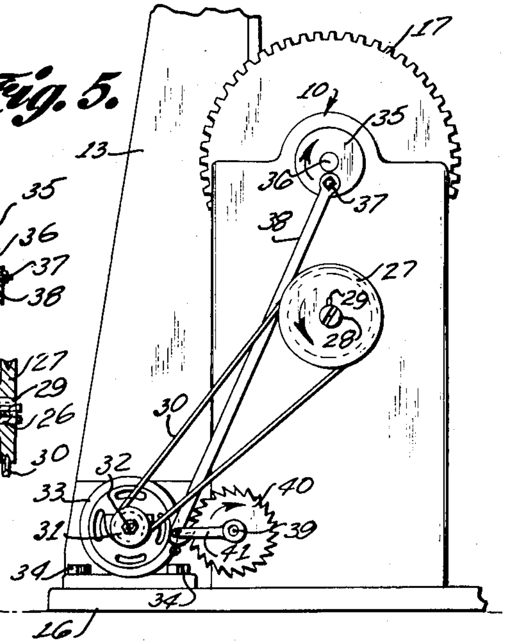
INVENTORS
Guillaume F. Selvaggio,
& Pierre C. Ringenbach.
BY Victor J. Evans & Co.
ATTORNEYS

SHAPER

Filed July 28, 1953 3 Sheets-Sheet 3

INVENTORS
Guillaume F. Selvaggio,
& Pierre C. Ringenbach.
BY *Victor J. Evans & Co.*

ATTORNEYS

United States Patent Office 2,750,852

Patented June 19, 1956

1

2,750,852

SHAPER

Guillaume F. Selvaggio and Pierre C. Ringenbach, New York, N. Y.

Application July 28, 1953, Serial No. 370,723

1 Claim. (Cl. 90—24)

This invention relates to machine tools of the milling or shaper type, and in particular a machine wherein the work is reciprocated with the cutter remaining stationary wherein with the work carried by an arm pivotally mounted in the lower part of the machine a convex surface will be cut on the work and with the positions of the parts reversed wherein the cutter is dropped below the work a concave surface will be cut on the work.

The purpose of this invention is to provide a machine tool for cutting, with a cutting tool convex or concave surfaces.

With the conventional type of shaper the work is held or bolted to a table or bed and the cutter is reciprocated across the upper surface to take a straight cut and in a milling machine a rotary cutter, also traveling in a straight line removes material to form a straight surface. In machines of this type the cutting tool travels across the work and it is difficult to make the tool travel on an arc. With this thought in mind this invention contemplates a machine actuating on the same principle as that of a shaper or milling machine except that the cutting tool is held stationary and the work is moved back and forth in relation to the tool, and with the parts operating in this manner it is possible to swing the work or piece of material being cut in an arc in relation to the cutting tool whereby convex and concave surfaces may be cut with the same machine tool.

The object of this invention is, therefore, to provide means for swinging a piece of material back and forth in relation to a cutting tool whereby arcuate surfaces are cut on the material.

Another object of the invention is to provide a machine tool for cutting arcuate surfaces on material in which the position of the cutting tool and also the radius of the cut being made are adjustable.

A further object of the invention is to provide a machine tool for cutting arcuate surfaces on material in which the tool is of a comparatively simple and economical construction.

With these and other objects and advantages in view the invention embodies a machine tool having a vertically disposed head with a bed in the form of an arm pivotally mounted in the lower part of the head and adapted to swing on a radius across the face of the head and a standard having a traveling carriage for adjustably holding a machine tool.

Other features and advantages of the invention will appear from the following description taken in connection with the drawings, wherein:

Figure 1 is a side elevational view of the improved machine tool.

Figure 2 is a plan view of the tool.

Figure 3 is a cross section through the tool taken on line 3—3 of Fig. 1 showing the swinging bed or pivotally mounted arm with which material being machined is carried back and forth across a cutting tool.

Figure 4 is a cross section through the machine taken

Figures 9, 10, 11, 12, 13, 14, 16:
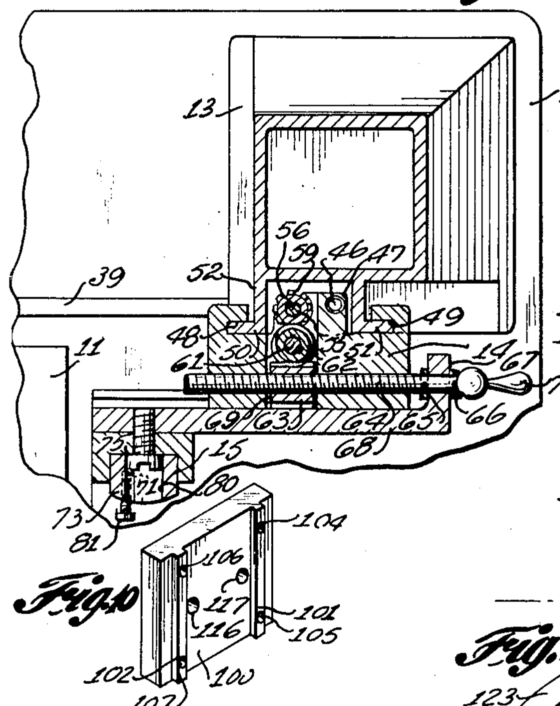

2 on line 4—4 of Fig. 1 showing the standard upon which the tool mounting carriage is slidably mounted.

Figure 5 is a rear elevational view of the machine with the upper part of the standard broken away.

Figure 6 is a longitudinal section through the machine taken on line 6—6 of Fig. 3 showing the construction of the head and mounting of the swinging arm or bed.

Figure 7 is a detail showing a section taken on line 7—7 of Fig. 3 illustrating the eccentric elements for swinging the arm or bed of the machine.

Figure 8 is a sectional plan taken on line 8—8 of Fig. 4 showing the construction of the tool carriage.

Figure 9 is a section taken on line 9—9 of Fig. 1 showing the construction of the standard upon which the tool carriage is mounted.

Figure 10 is a perspective view showing a work mounting plate adapted to be positioned on the swinging arm or bed of the machine.

Figure 11 is a perspective view showing a work clamping plate adapted to be used in combination with the plate shown in Fig. 10 for holding material on which it is desired to cut a convex surface.

Figure 12 is a similar clamping plate adapted to be used with material on which it is desired to cut a concave surface.

Figure 13 is a front elevational view of the swinging arm or bed of the machine.

Figure 14 is a cross section through the swinging arm or bed taken on line 14—14 of Fig. 13.

Figure 15 is a detail showing a section taken on line 15—15 of Fig. 1 illustrating the tool holder at the end of the tool carriage.

Figure 16 is a detail illustrating the ratchet for actuating the swinging arm or bed with an intermittent movement.

Referring now to the drawings wherein like reference characters denote corresponding parts the improved machine tool of this invention includes a head 10, a swinging arm or bed 11 pivotally mounted with a pin 12 in the lower part of the head, a standard 13 spaced from the head, a carriage 14 mounted to travel vertically on the standard and having a tool holder 15 extended from one end, and a base 16 upon which the head and standard are mounted.

The head 10, which is mounted on one end of the base, provides supporting means for transmission elements and also for the gear 17 which carries the eccentric roller 18 that reciprocates the arm or bed and, as illustrated in Fig. 6, the gear 17 is mounted on the end of a shaft 19 that is journaled in an opening 20, providing a bearing in the upper part of the head.

The gear 17 is rotated by a spindle 21 which is journaled in the head in bearings 22 and 23 and which is provided with a pinion 24 that meshes with the gear 17. The pinion 24 is retained in meshing relation with the gear 17 by a spacing washer 25 positioned between the pinion and face of the head. The opposite end of the spindle 21 is provided with a pin 26 on which a pulley 27 is retained by a cap screw 28 in combination with a key 29. A belt 30, trained over the pulley 27 is also trained over a pulley 31 on a shaft 32 of a motor 33. The motor is mounted on the base 16 and is secured in position with bolts 34.

The shaft 20 is also provided with an eccentric formed with a disk 35 that is secured on a stud 36 extended from the end of the shaft and a pin 37, eccentrically positioned on the disc 35 is connected by a rod 38 to a ratchet on a shaft 39 which extends from the head.

The ratchet includes the toothed-wheel 40 which is mounted on the shaft 39 and an arm 41 also mounted on the shaft 39 and pivotally connected to the rod 38 with a pin 42. The pin 42 is also provided with a pawl 43 resiliently held upwardly by a spring 44 and adapted to be retained in operative engagement with the teeth of the wheel 40 with a lug 45. Upon each revolution of the disc 35 the pawl moves upwardly rotating the shaft 39 a distance of one or more teeth, as may be desired.

The carriage 14 is vertically adjusted by a feed screw 46 that is threaded through a lug 47 at the back of the carriage and, as illustrated in Fig. 8 the carriage is provided with vertically disposed parallel slots 48 and 49 in which tongues 50 and 51, extended from a section 52 of the standard are positioned whereby the carriage is adapted to slide on the standard. The upper end of the feed screw 46 is provided with a hand wheel 53 from which a handle 54 extends. By this means the elevation of the carriage 14 is adjusted vertically.

The standard 13 is also provided with a rod 55 having a keyway 56 therein and this rod is rotated by a beveled gear 57 on the shaft 39, the beveled gear meshing with a similar beveled gear 58 on the rod 55. By this means the rod 55 is rotated intermittently by the pawl 43 of the ratchet with each revolution of the disc 35 on the shaft 19.

A gear 59, keyed to the rod 55, meshes with a gear 60 on a stub shaft 61 and a spiral gear 62 on the shaft 61 meshes with a spiral gear 63 on a screw 64 which feeds the cutting tool across the work. The screw 64 is provided with collars 65 and 66 that are positioned on opposite sides of a flange 67 extended from a bed plate 68 and, as shown in Fig. 8, with the gear 63 positioned in a slot 69 rotation of the gear on the screw 64 moves the bedplate 68 horizontally on the carriage 14. The screw 64 is also provided with a handle 70 by which the screw 64 may be manually rotated to withdraw or adjust the position of the cutting tool.

A cutting tool 71 is secured in a slot 72 in a swinging jaw or plate 73 that is pivotally mounted on the tool holder 15 with a pin 74 and with the tool holder 15 secured to the bedplate 68 with a cap screw 75 the tool is adapted to swing in relation to the tool holder. The rear portion of the bedplate 68 is provided with slots 76 and 77 that are positioned to receive tongues 78 and 79, respectively that extend from the carriage 14, as shown in Fig. 4. As shown in Fig. 2 the tool holder 15 is provided with a vertically disposed slot 80 in which the plate 73 is positioned.

The tool holder 15 with the bedplate 68 is, therefore, adapted to travel horizontally with the tool being fed, step by step, across the upper surface of the work and the screw may be fed by the ratchet or by the handle or crank 70 which may be rotated by hand.

The cutting tool 71 is secured in the socket 72 with a set screw 81 whereby the tool may be removed and replaced as desired.

The motor 33, through the spindle 21, shaft 19 and gears 24 and 17 actuates the roller 18 which swings the arm or bed 11 to provide a reciprocating action across the path of the tool. The roller 18 is mounted on a pin 82 carried by a gear 83 journaled on a stud 84 positioned in a recess 85 in the gear 17 and, as shown in Fig. 7, the stud 82 is provided with a collar 86 that provides a spacer separating the roller from the gear. The gear 83 meshes with a pinion 87 having a stud 88 whereby the pinion is journaled in the gear 17 with the teeth thereof meshing with the teeth of the gear 83. The stud 88 is secured in position with a cap screw 89 and the outer surface of the pinion is provided with a socket 90 by which the pinion may be rotated to adjust the position of the roller on the gear 17.

The roller 18 extends into and travels in a slot 91 in the machine bed or arm 11 and as the roller 18 travels around with the gear 17 the upper end of the arm 11 or bed swings from one side to the other and work mounted on the bed travels back and forth below the cutter 71. A backing washer 92 is positioned between the gear 17 and face of the head 10 and the lower end of the bed or arm 11 is provided with a hub 93 through which the stud or shaft 12 extends.

The arm is secured on the pin or stud 12 with a pin 94. The inner end of the stud is provided with a head 95 which extends through a lug 96 providing a bearing.

The arm or bed 11 is also provided with parallel elongated slots 97 and 98 and a mounting plate 100, which is provided with ribs 101 and 102 is positioned against the face of the bed 11 with the ribs extended into the grooves 97 and 98, as shown in Fig. 14. The mounting plate 100 is secured to the bed 11 with bolts 103 positioned in openings 104 and 105 on one side of the plate and 106 and 107 on the opposite side and, as shown in Fig. 14 the heads of the bolts are positioned in countersunk openings as indicated by the numeral 108 and the opposite ends of the bolts are provided with nuts 109.

A plate or other work to be cut on the machine is clamped against the plate 100 with a clamp plate 110, as shown in Fig. 11 or with a similar plate 111, shown in Fig. 12. The plate 110 is provided with openings 112 and 113 for bolts 114 and 115 that extend through the openings 112 and 113 and that are threaded in openings 116 and 117 in the plate 100. The plate 110 is also provided with openings 118 and 119 in which cap screws 120 are threaded whereby, with the bolts 114 and 115 in position the thick portion 121 above the shoulder 122 is rigidly clamped against work positioned between the part 121 and the mounting plate 100.

As illustrated in Fig. 11 the upper surface 123 of the plate 110 is convex and the upper surface 124 of the plate 111 is concave whereby the plate 110 is used when it is desired to cut a convex surface and the plate 111 is used when it is desired to cut a concave surface.

The clamping plate 111 is also provided with openings 125 and 126 that are positioned to receive bolts, such as the bolts 114 and 115, and openings 127 and 128 that are positioned to receive the cap screws 120.

With the parts arranged in this manner, work clamped between one of the plates 110 and 111 and the mounting plate 100 may be machined with a convex upper surface with the cutting tool in the position illustrated in Figs. 1 and 9 and with the position of the cutting tool reversed work clamped between the plate 111 and the plate 100 may be machined with a concave under surface.

The stroke of the bed 11 which carries the work is readily adjustable by turning the gear 83 to adjust the position of the roller 18 and the feed of the cutting tool across the work is readily adjustable by the ratchet.

Although the machine is illustrated as having the work positioned on the swinging arm or bed 11 and the tool on the standard, it will be understood that the parts may be reversed with the work clamped to the standard and the tool holder positioned on the swinging arm or bed 11.

It will be understood that modifications, within the scope of the appended claim, may be made in the design and arrangement of the parts without departing from the spirit of the invention.

What is claimed is:

In a machine tool, the combination which comprises a vertically disposed head mounted on a base, a standard spaced from the head and also mounted on the base, a vertically positioned swinging arm having a longitudinally disposed slot therein, said arm being pivotally mounted in the lower part of the head providing a bed, an eccentrically positioned roller journaled in the head and extended into the slot of the bed for reciprocating the bed, work clamping means adjustably mounted on the bed, a carriage mounted to slide vertically on the standard, a plate mounted to slide horizontally on the carriage, means for adjusting the position of the plate on the carriage, means for manually adjusting the position of the carriage on the standard, a tool holder carried by the plate mounted to slide horizontally on the carriage and positioned whereby a tool clamped therein is adapted to cut work clamped to the bed, and means extended from the head to the standard for feeding the plate with the tool holder thereon with the tool traveling across the work with intermittent movements.

References Cited in the file of this patent

UNITED STATES PATENTS

| | | |
|---|---|---|
| 264,628 | Cockfield et al. | Sept. 19, 1882 |
| 818,423 | Dunn | Apr. 24, 1906 |
| 1,272,549 | Smith | July 16, 1918 |
| 2,590,042 | Root | Mar. 18, 1952 |
| 2,669,163 | Sandkaulen | Feb. 16, 1954 |